(12) United States Patent
Azvine et al.

(10) Patent No.: US 7,370,020 B1
(45) Date of Patent: May 6, 2008

(54) SEQUENCE GENERATOR

(75) Inventors: Behnam Azvine, Ipswich (GB); David Djian, Ipswich (GB); Kwok C Tsui, Colchester (GB); Neill R Taylor, London (GB); John G Taylor, London (GB)

(73) Assignee: British Telecommunications public limited company, London (GB)

( * ) Notice: Subject to any disclaimer, the term of this patent is extended or adjusted under 35 U.S.C. 154(b) by 971 days.

(21) Appl. No.: 10/110,471

(22) PCT Filed: Nov. 10, 2000

(86) PCT No.: PCT/GB00/04312

§ 371 (c)(1),
(2), (4) Date: Apr. 12, 2002

(87) PCT Pub. No.: WO01/35336

PCT Pub. Date: May 17, 2001

(30) Foreign Application Priority Data

Nov. 12, 1999 (EP) .................... 99309017

(51) Int. Cl.
G06N 3/02 (2006.01)

(52) U.S. Cl. ................. 706/15; 706/10; 706/12; 706/14; 706/26

(58) Field of Classification Search ............ 706/6, 706/10, 14–16, 18, 20, 25, 28, 31, 39, 45, 706/46
See application file for complete search history.

(56) References Cited

U.S. PATENT DOCUMENTS

| | | | | |
|---|---|---|---|---|
| 4,914,603 A | * | 4/1990 | Wood | 706/25 |
| 5,095,443 A | * | 3/1992 | Watanabe | 706/10 |
| 5,155,801 A | * | 10/1992 | Lincoln | 706/20 |
| 5,295,227 A | * | 3/1994 | Yokono | 706/28 |
| 5,303,330 A | * | 4/1994 | Gersho et al. | 706/16 |
| 5,434,783 A | | 7/1995 | Pal et al. | |
| 6,009,418 A | * | 12/1999 | Cooper | 706/15 |
| 6,018,727 A | * | 1/2000 | Thaler | 706/16 |
| 6,601,049 B1 | * | 7/2003 | Cooper | 706/15 |
| 2001/0011259 A1 | | 8/2001 | Howard | |

OTHER PUBLICATIONS

Y.S. Yeun, et al, "Multiple Neural Networks Coupled with Oblique Decision Trees: A case study on the configuration design of midship structure" 1997 IEEE, p. 161-167.*

Yuen et al. "Multiple Neural Networks Coupled with Oblique Decision Trees: A Case Study on the Configuration Design of Midship Structure", IEEE, 1997.*

Wang et al, "A Connectionist Model For Dialog Processing", International Conference on Acoustics, Speech & Signal Processing, ICASSP, US, New York, IEEE, vol. CONF 16, 1991, pp. 785-788, XP000222246.

(Continued)

Primary Examiner—David Vincent
Assistant Examiner—Omar F Fernández Rivas
(74) Attorney, Agent, or Firm—Nixon & Vanderhye P.C.

(57) ABSTRACT

Apparatus for generating sequences of elements including at least one task unit, each of which has an upper and a lower neural network connected in a hierarchical relationship and is operable to output a sequence of elements. Each of the upper and lower neural networks is a class of temporal neural networks having an infinite number of internal states.

11 Claims, 15 Drawing Sheets

OTHER PUBLICATIONS

Sheng et al, "Temporal Associative Memory with Finite Internal States", Proceedings of the International Conference on Neural Networks, (ICNN), US, New York, IEEE, 1994, pp. 1109-1114, XP000532179.

Park et al, "A Hierarchical Neural Network Approach to Intelligent Traffic Control", Proceedings of the International Conference on Neural Networks (ICNN), US, New York, IEEE, 1994, pp. 3358-3362, XP000532726.

Amit et al, "Architecture of Attractor Neural Networks Performing Cognitive Fast Scanning" Network: Computation in Neural Systems, GB, IOP Publishing, Bristol, vol. 1, No. 2, Apr. 1, 1990, pp. 189-216, XP000134773.

Trippi et al., "Neural Networks in Finance and Investing," Probus Publishing (1993), pp. 1-513.

Haykin, S., "Neural Networks: A Comprehensive Foundation," NY: Macmillan (1994), p. 2.

* cited by examiner

SEQUENCE GENERATOR

This application is the US national phase of international application PCT/GB00/04312 filed 10 Nov. 2000 which designated the U.S.

BACKGROUND

1. Technical Field

The present invention relates to a sequence generator, and is suitable particularly but not exclusively for generating sequences of elements such as numbers or task names.

2. Description of Related Art

Machine learning systems are, among other things, applied as a mechanism for learning information that can then be applied to efficiently automate and control various processes such as control of a plant, prediction of markets, scheduling of tasks, understanding of spoken text, or of datamining applications. Examples of applications that use machine learning in this way include load-balancing systems[i] for a distributed computer system, where load-balancing parameters are learnt and applied to achieve efficient scheduling of tasks within the computer system, and systems for learning sequences to create planning solutions and schedule system or user tasks. The latter embeds Temporal Sequence Storage and Generation (TSSG), which is based on observations of sequence retention by biological systems, of learnt sequences into the system to create a schedule of tasks.

Neural networks, which are artificial systems comprising a number of nodes connected by links, are ideally suited to model TSSG, as they can be trained using inductive learning algorithms. Current neural networks that achieve TSSG include time-delay nets[ii], which implement Hakens embedding theorem, and various recurrent models, such as the spin-glass[iii]; nets with context neurones[iv]; the Elman net and extensions thereof[v]; and the crumbling history approach[vi]. However, the spin-glass is limited to reproducing short sequences, the Elman net uses associative chaining to generate sequences, which is computationally expensive, and the crumbling history approach cannot plan successfully using learnt sequences. In all of these cases, the ability of the neural networks to usefully be integrated into systems that perform complex scheduling tasks such as work pattern management is limited. U.S. Pat. No. 5,434,783 discloses a control system for controlling noise and/or vibration in an automotive vehicle. The control system utilises a control neural network and an identification neural network arranged in a hierarchical relationship, where output from the control neural network is used to control a loud speaker and piezoelectric actuator. The identification neural network receives output signals from the control neural net together with signals from an in-vehicle microphone and outputs a control predicted value. This control predicted value is then compared with a control target value and the result of the comparison is used to correct the connection weights of the control neural network.

SUMMARY OF NON-LIMITING EXEMPLARY EMBODIMENTS

According to one aspect of the present invention, there is provided neural network apparatus, including a task unit, which task unit has an upper and a lower neural network connected in a hierarchical relationship. The upper neural network and the lower neural network each comprise at least a first layer and a second layer. The second layer has feedback to the first layer via a further layer, and each neural network is operable to output a signal indicative of a sequence of elements. In particular the apparatus comprises a plurality of task units, wherein one upper neural network is common to at least two of the plurality and is operable to output a sequence of elements. The order in which elements occur in this sequence determines the order in which the task units are activated.

Preferably there are at least two upper neural networks, and each task unit is interconnected with at least one other task unit of the plurality by a weighted connection. The weighted connection can be used in setting a preference for activating one task unit with respect to the other task units of the plurality. In one arrangement, the weighted connection can be located between the second layer of the upper neural network of each of the task units. The apparatus can also include means for varying the weight on such a weighted connection, for use in changing the said preference.

According to a second aspect of the present invention, there is provided a method of generating an ordered sequence of elements, including the steps of:

(i) connecting the output of at least a first neural network to the inputs of at least second and third neural networks to provide a task unit, (ii) training each of said neural networks to output an element sequence of a desired number of elements in response to a single element input, (iii) inputting a single element to the first neural network such that it outputs an element sequence, elements of which sequence provide respective single element inputs to the second and third neural networks, such that inputting a single element input to the first neural network provides an output from the task unit comprising the ordered sequence of elements.

BRIEF DESCRIPTION OF THE DRAWINGS

Further aspects, features and advantages of the sequence generator will now be described, by way of example only as an embodiment of the present invention, and with reference to the accompanying drawings, in which.

DETAILED DESCRIPTION OF NON-LIMITING EXEMPLARY EMBODIMENTS

In the following description, the terms "layer", "node", "activity", "weight", "inhibitory weight", "excitatory weight" and "weight initialisation" are used. These are defined as follows:

A "layer": a data store such as an array, or a matrix, of elements, which elements are the nodes described below;

A "node": an array element which receives inputs from, and provides outputs to, other array elements within the same layer or elements within different layers;

"Activity": values in the array elements computed from input functions from and output functions to connected layers;

"Weight": a multiplier which is applied to the input and output functions, and which controls the amount of activity input to or output from each node;

"Inhibitory weight": a multiplier having a value less than 0;

"Excitatory weight": a multiplier having a value greater than 0;

"Weight initialisation": the sequences generated by the present invention are controlled by the configuration of the layers, the functions between connected layers, and the weights. The means of generating a sequence of elements includes a computational process, and the various parameters in the controlling equations require suitable initialising. Thus weight initialisation refers to the initial configuration of the weights;

"Task": a category of work, such as email, report, meeting etc.

"Sub-task": a subset of a task, so for a task of email, a sub-task may be open email, read email, reply to email, archive email etc.

Figure 1:
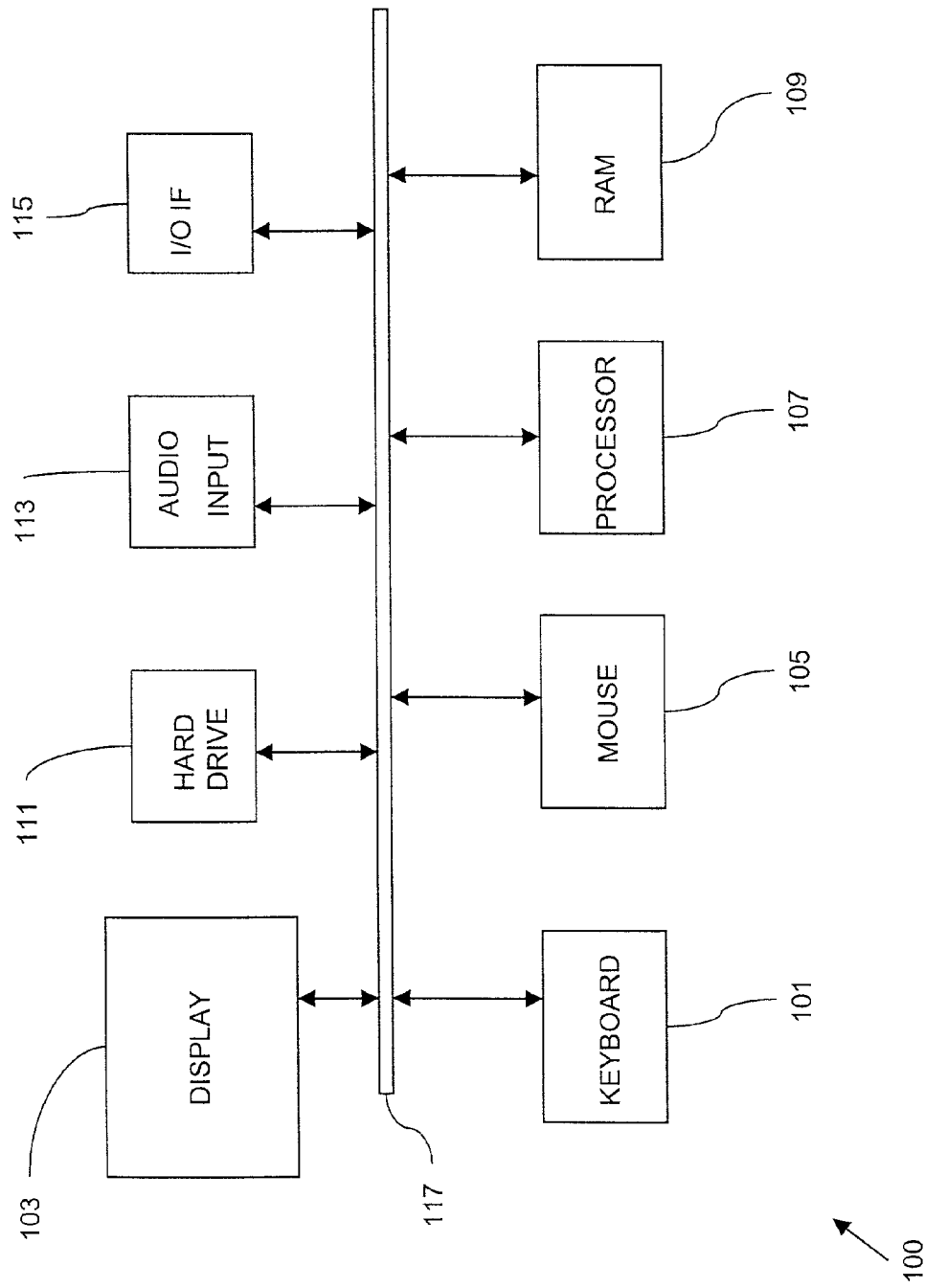
FIG. 1 is a schematic block diagram of the hardware of a computer system configured to run a sequence generator of the present invention.

FIG. 1 shows a generally conventional computer system 100 that comprises: a conventional keyboard 101; a display screen 103, such as a CRT or plasma screen; a mouse 105; a processor 107 such as a Pentium™ processor; random access memory 109; a hard disc drive 111; an audio input 113 such as a microphone to detect utterances from the user; and input/output interfaces 115 to connect the workstation to a local area network (LAN) and wider area networks (WAN) such as the internet, to facilitate data exchange including e-mail messaging with remote users connected to such networks. The interface 115 also allows control of a plain old telephone set (POTS) and the components shown in FIG. 1 are interconnected by a common bus 117. In addition to the single system configuration shown in FIG. 1, several computer systems (not shown) may be interconnected over a local area network via the input/output interface 115.

Figure 2:
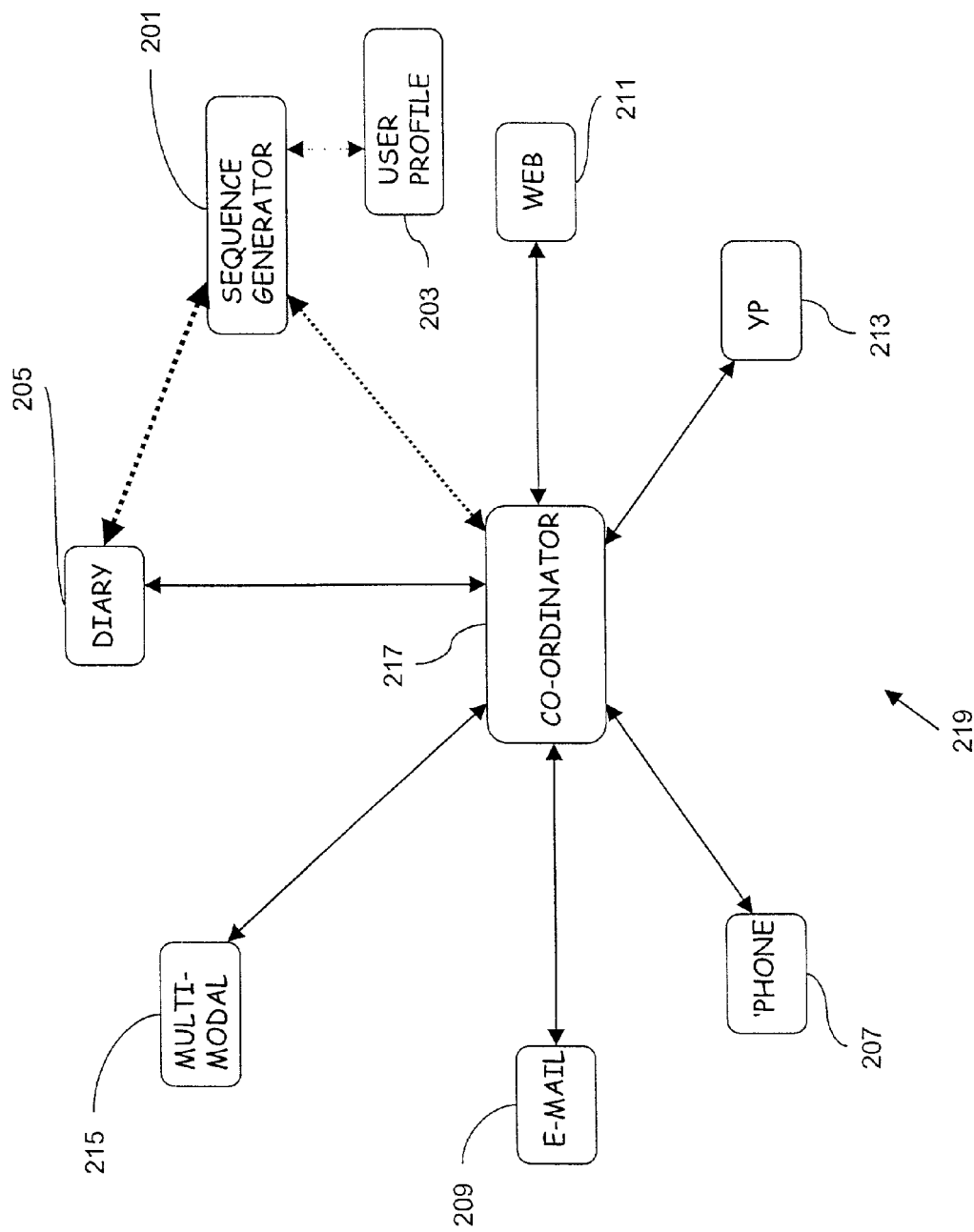
FIG. 2 is a schematic diagram showing the sequence generator interacting with a plurality of intelligent agents according to the present invention.

Referring also to FIG. 2, apparatus 201 for generating sequences of elements to be executed by a computer system 100 may be stored on the hard disc drive 111 for processing by the processor 107. In the embodiment described herein, the apparatus 201 may be part of an intelligent assistant (IA) system 219, which enables users to devote their time to highly complex tasks while the system 219 takes some decisions on behalf of the user based on previous observations of the user or stored user preferences. It does this by generating a sequence of elements, which are tasks to be carried out by the IA system 219 for the user. Typical tasks to be performed by the system include time, information and communication management. When the computer system comprises several computer workstations, several intelligent assistant systems 219 may be active and may communicate with one another.

As shown in FIG. 2, such an IA system 219 may additionally comprise a set of autonomous systems 205, 207, 209, 211, 213, 215, 217 generally referred to as agents, specialising in various tasks such as diary management, telephone call filtering and e-mail prioritisation, web search, telephone directory enquiry, multi-modal interface and communication flow management. Each agent has its own interface and interacts with the user in its own particular way, and the agents communicate with one another by message passing. These agents are essentially reactive agents that respond to events in the user's environment (such as e-mails and telephone calls) by initiating interactions with the user. Apparatus according to an embodiment of the present invention 201 provides infrastructure management of tasks to be performed by the user, based on learnt behaviour patterns of the user. The apparatus 201 may interact with the diary assistant 205, organising a pool of tasks, which may be a user's tasks for a day, and generating a sequence order for the tasks based on what it knows about the user's preferred work patterns. This information may be available as a user profile 203, and may include information as a function of the user's context—i.e. their mood, time of day, and availability—which may be compiled in real time and with inputs from the agents comprising the intelligent assistant system 219. The apparatus 201, when integrated into the intelligent assistant system 219, may also be used to organise inter-agent tasks such that it 201 directs a preferred order of agent tasks based on learnt agent capabilities. Thus the elements sequenced by the apparatus 201 may include work tasks and sub-tasks for a range of entities, such as a user, a piece of equipment or a business. In the following description, work tasks and sub-tasks of a user are described as examples of elements which can be sequenced by embodiments of the present invention.

The apparatus 201 of the present embodiment includes an artificial intelligence (AI) system, whose design is based on the mechanics and inner workings of the brain, in particular, of the human brain. In the field of AI, a goal is to artificially reproduce the functionality of the brain, and current thinking bases the nature of mental representations on the working memory systems of the brain. (See Baddeley and Hitch [1974] "Working Memory", pp. 47-90 in Recent Advances in learning and motivation Vol VIII.) One of the most important applications of artificial intelligence is the integration and modelling of the various working memory components in such a way as to produce intelligent behaviour. The present invention is concerned with modelling the way in which biological systems store and generate sequences (TSSG) and applying the model to create a system capable of generating sequences of elements in a known order.

Figure 3:
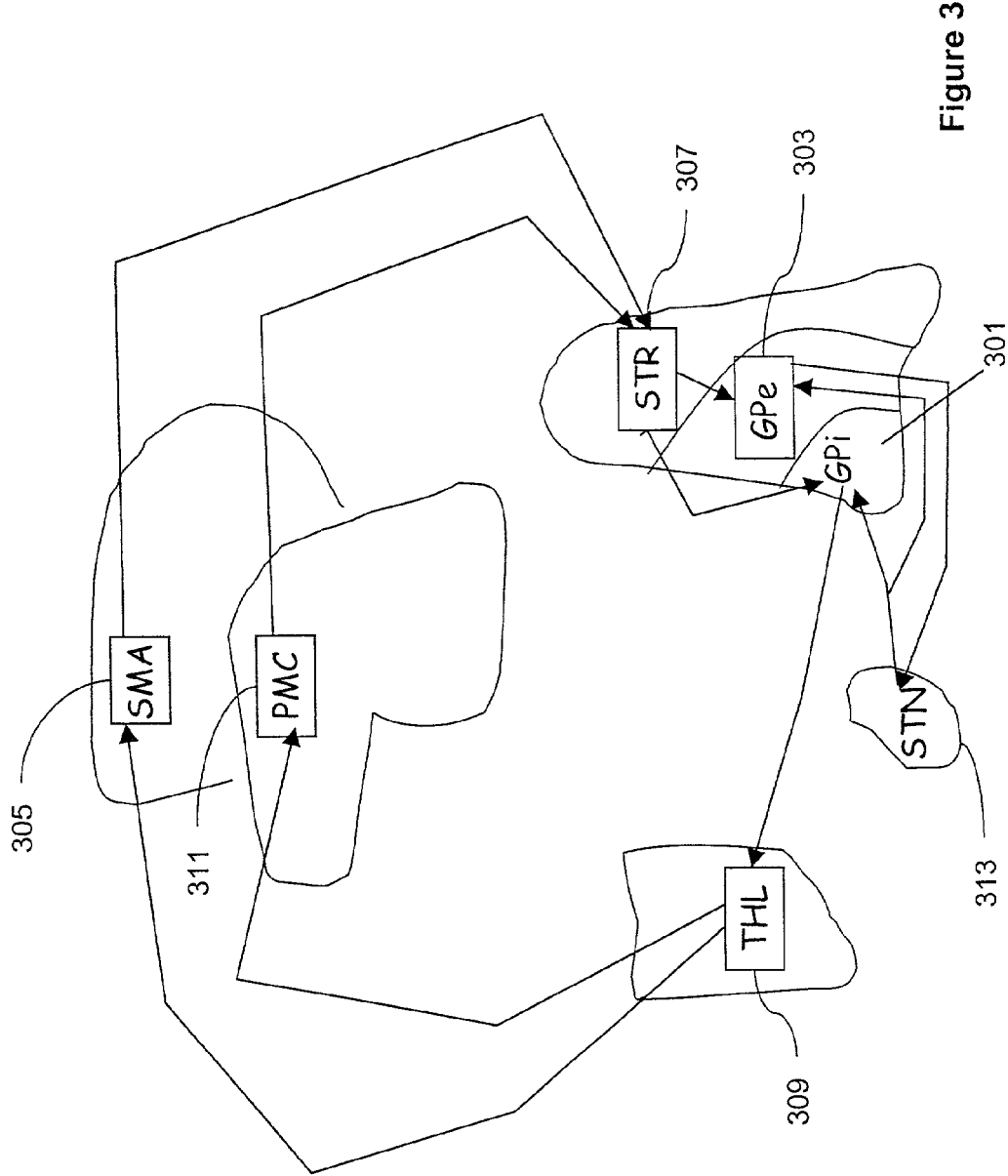
FIG. 3 is a pictorial representation of a part of the biological functionality of the brain, in particular the somatotopic organisation of the basal ganglia-thalamocortical loop for motor control, to aid in understanding aspects of the present invention.

The apparatus 201 includes implementation of a recurrent loop, which is considered to be crucial to achieving long-lasting activity of neural cells, for motor control, called the cortico-basal ganglia-thalamocortical loop (basal ganglia-thalamus-cortex). In order to understand the biological basis for the present invention, FIG. 3 of the accompanying drawings show relevant areas of the brain. The basal ganglia is one of two subcortical structures located in the frontal lobes, and includes the striatum, (STR 307) the subthalamic nucleus (STN 313) and globus pallidus (GP 301, 303). The subthalamic nucleus (STN 313) is a component of the extrapyramidal motor system and interconnects elements of the basal ganglia. The basal ganglia serves a role in the planning and control of complex motor patterns, i.e. assists with movement preparation. The motor cortex comprises the primary motor cortex (MI), the pre-motor cortex (PMC 311) and the supplementary motor area (SMA 305), and is selectively involved in the production of skilled movements, thus regulating the development of muscular force during movement. The thalamus (TH 309) is effectively a clearinghouse for all signals that want to reach the cortex. Each brain region of a motor circuit is somatotopically organised, which means that the arm region of the SMA 305 projects to the arm region of the STR 307 and the TH 309. The arrows in FIG. 3 show one input and one output from each area only, but there should be one for each of the face, arm, leg, etc.

Figure 4:
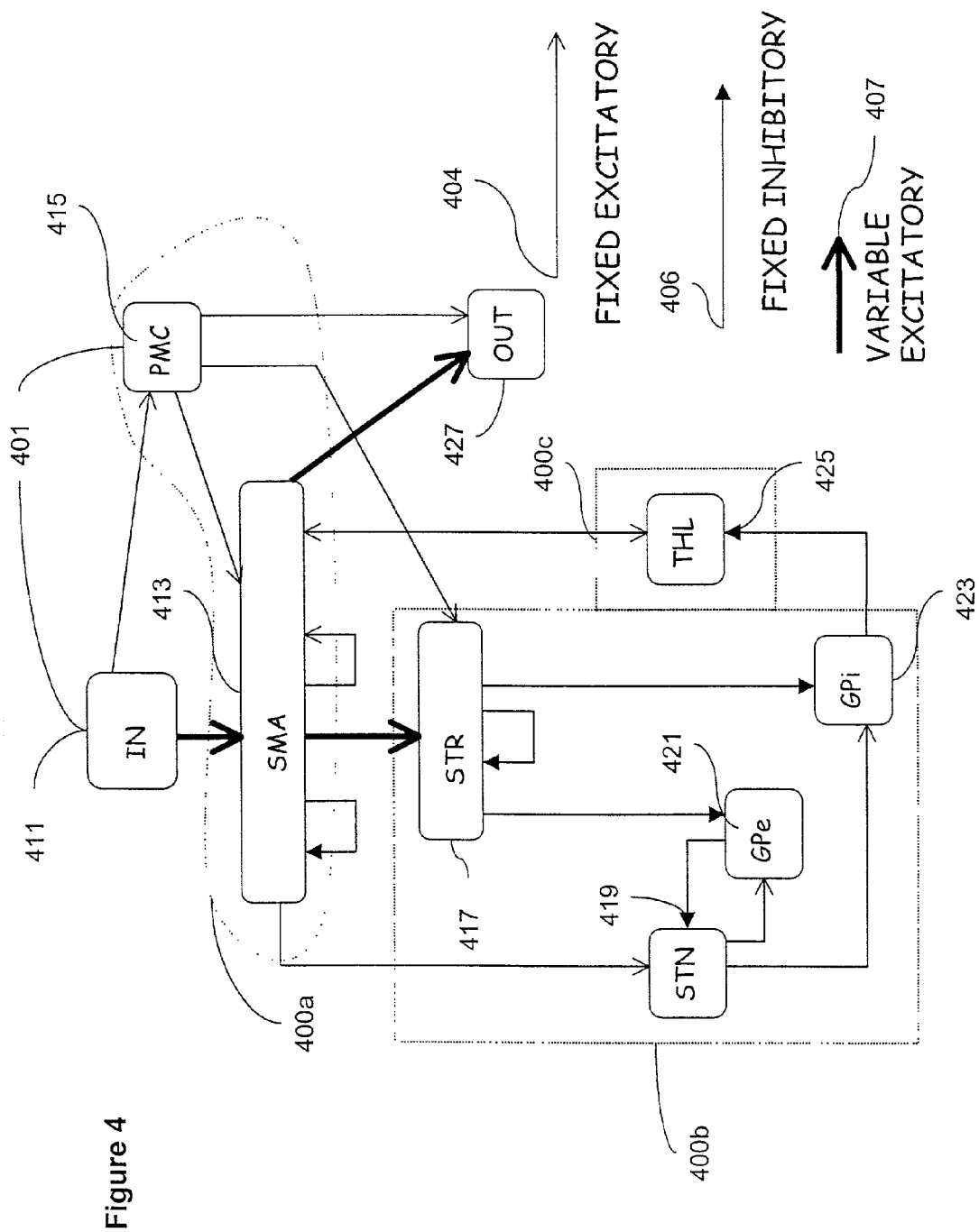
FIG. 4 is a schematic representation of a recurrent neural network known as the ACTION network which simulates the biological functionality of FIG. 3.

The apparatus 201 implements a neural network system capable of temporal sequence storage and generation of work actions, or tasks. It is based on a network known as the ACTION networks (see Taylor & Alvi 1996 "A basis for long-range inhibition across cortex", in Lateral Interactions in Cortex: Structure and Function), shown as a cartoon version of the frontal lobes cortical (cortex) and sub-cortical structures (basal ganglia, cerebellum) in FIG. 4, which is a recurrent neural network. The ACTION network 403 comprises a plurality of layers 401, which are specifically a first layer 400a comprising two cortical regions, the SMA 413 and the PMC 415; a second layer 400b comprising the basal ganglia, composed of the STR 417, the STN 419 and the GPe, GPi, 421, 423 (external and internal respectively); and a further layer 400c comprising the THL 425. FIG. 4 shows indicator 401 pointing to a selection of layers only for clarity.

Figure 5:
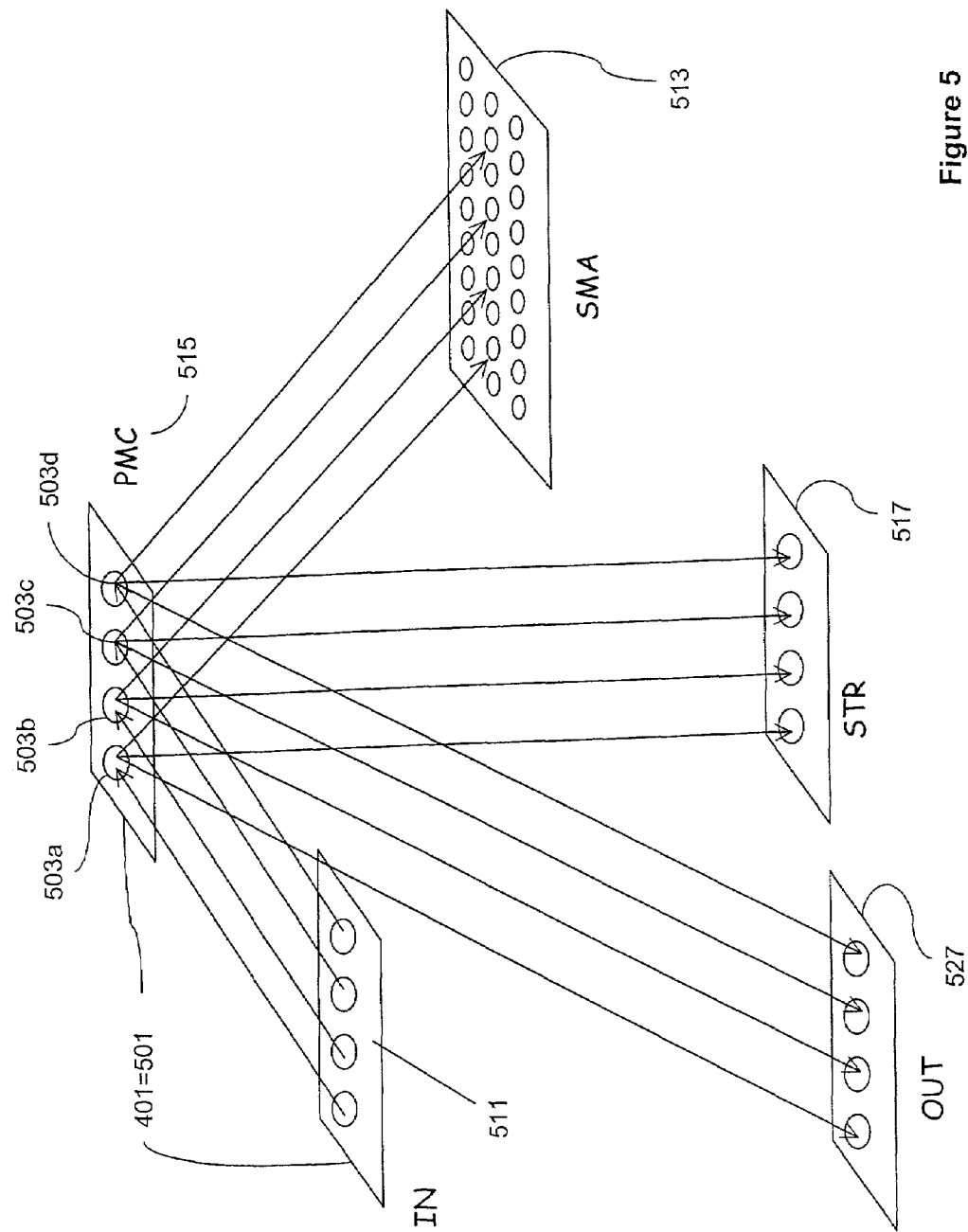
FIG. 5 is a perspective schematic representation of interlayer node connections of the ACTION network of FIG. 4.

FIG. 5 shows the topography of the ACTION network 403, and each layer, shown generally as 501, comprises nodes 503. The process of transferring information through the sensory system includes propagating signals from neurone to neurone by complicated electrochemical reactions via neurone connecting junctions called synapses. FIG. 5 shows arrangements of 4×1 nodes, which model the functionality of neurones, on the IN 511, OUT 527, STR 517, PMC 515 layers, and 9×3 nodes on the SMA 513 layer, although it is understood that any number and pattern of nodes could be used. For simulations, the number of nodes chosen is a compromise between accuracy (i.e. use enough nodes to generate a realistic solution) and cost (i.e. computational time). The connections 505 between the layers represent an inter-layer transfer of potential from connected nodes, and this includes one, or a mixture, of connectivity parameters. Examples of connectivity parameters include:

1. All-to-All, where all of the nodes on a layer are connected to each node of a connected layer;
2. One-to-One, where each node on a layer is connected to a single node of a connected layer.
3. Gaussian, where each node is connected to a group of nodes and the distribution of weight with distance from the centre node is Gaussian;
4. Mexican hat distribution, where the distribution of the weights against distance from a node is a Mexican hat function. This parameter weight distribution function can be used with either of (1) or (2).

FIG. 5 shows a One-to-One connectivity between nodes.

Referring back to FIG. 4, the connections between the various layers 401 include a mixture of open and closed arrow heads. This distinguishes between excitatory 404 and inhibitory 406 links, and the weight associated with each link provides a measure of how excitatory or inhibitory that link is. FIG. 4 also shows intra-layer links on the SMA 413 and STR 417, and these represent intra-layer connections as well as the inter-layer connections shown in FIG. 5.

Most of the sub-cortical structure 417, 419, 421, 423 provides for a competition of excitatory input and inhibitory input onto the GPi 423 via the STN 419 and STR 417 respectively. The links on 404 and 406 are fixed in weight, but the links 407 have adaptable weights. This weight adaptability provides a means for varying the inter-layer transfer of signals, such that for a given Input, the Output from the ACTION network 403 varies as a function of both the weights of the links and of the strength of the node activity coming into the link (see for example equations 1 to 4 later). The ACTION network 403 is capable of providing an output array of size one or more, and in this embodiment each ACTION network provides four outputs. However, it should be understood that each ACTION network of the present invention is operable to provide more than four outputs. In the case of the present embodiment, therefore, if the inputs are work sub-tasks, the number of output sub-tasks from a single ACTION network 403 is four. When these sub-tasks are stored in an array, the order in which tasks are to be performed is thus given by the array indexing.

Figure 6:
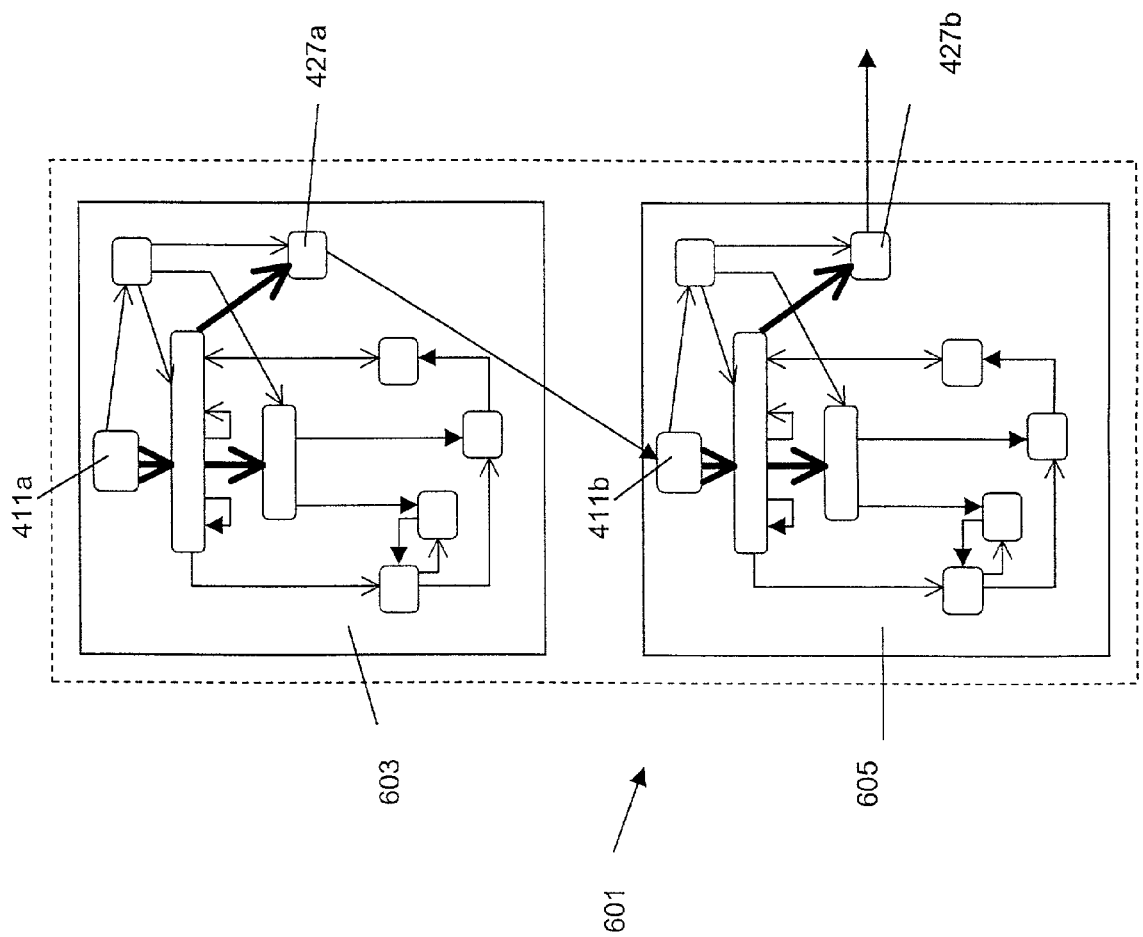
FIG. 6 is a schematic representation of a task unit according to the present invention, comprising one upper and one lower ACTION network arranged in a hierarchical relationship.

Embodiments of the present invention couple together a number of ACTION networks 403 in a hierarchical relationship to form a task unit 601, shown in FIG. 6 for two ACTION networks: one upper network 603 and one lower network 605. The output 427a from the upper ACTION network 603 provides the input to the lower ACTION network 605, at 411b, and this generates output 427b from the task unit 601. Thus the only difference in architecture between the upper and lower ACTION networks is the inclusion of connection 427a from the upper ACTION network 603 to the lower ACTION network 605.

Figure 7:
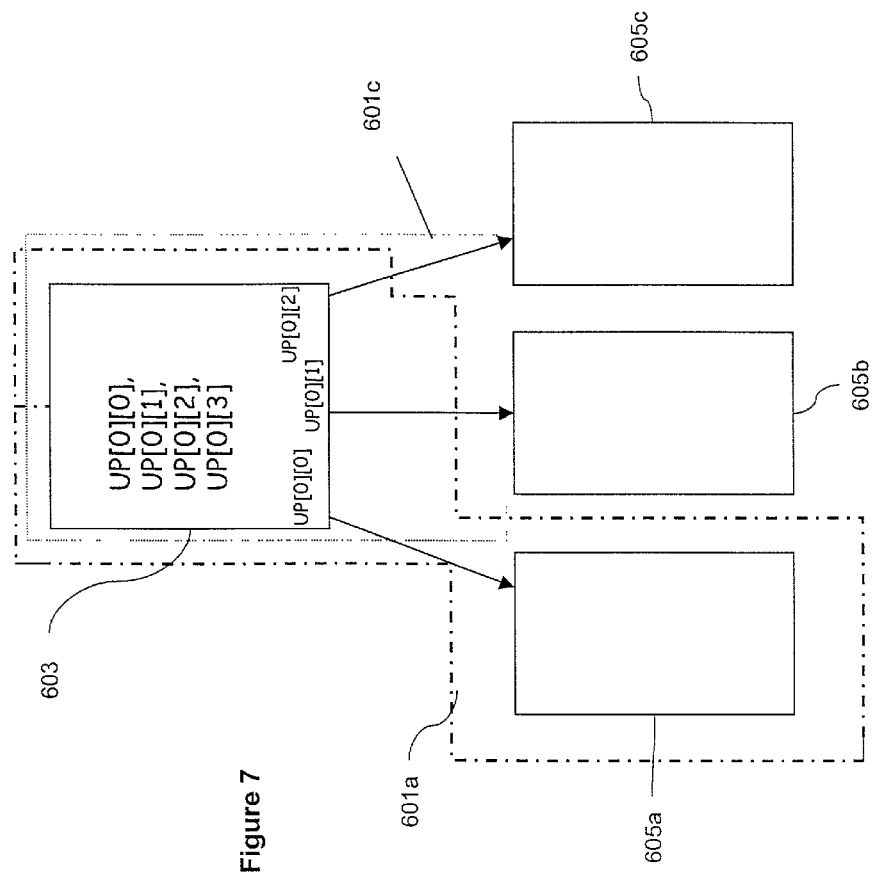
FIG. 7 is a schematic representation of three task units according to the present invention, comprising one upper and three lower ACTION networks arranged in a hierarchical relationship.

There may be a plurality of task units 601a, 601b, 601c, comprising one upper ACTION network 603 connected to a plurality of lower ACTION networks 605a, 605b, 605c, as shown in FIG. 7 (601b is omitted from the Figure for clarity). As all of the networks are identical with respect to their components, they are each capable of storing up to four values (which for this particular embodiment are tasks or sub-tasks thereof). Thus, and with reference to FIG. 7, the sequence of four values of the upper ACTION network 603 array dictates the order in which the same interacts with each of the lower ACTION networks 601a, 601b, 601c. The process by which a particular sequence ordering is achieved is described in detail later in the description. Clearly the number of outputs dictates the number of lower ACTION networks 605 to which an upper ACTION network 603 may connect, which for the present embodiment is four.

FIG. 7 shows a two-level structure for the task unit of the present invention, but there is no limit to the number of levels that may be connected to provide output sequences. The selection of the number of levels is a design choice, depending on, in the case of the present embodiment, the length of sub-tasks comprising a task. If, for example, a task comprises more than sixteen sequences, the only way that such a sequence could be simulated in the present embodiment would be by introducing multiple levels of task unit. In such situations, the system may be categorised in terms of numerous upper and lower ACTION network couplings, where a lower ACTION network for one coupling may also be an upper ACTION network for another coupling.

The neural network described in the embodiment above is the ACTION network, and other neural networks, which have the essential feature of recurrence, may also be used as upper and lower networks. The multiple hierarchical arrangement of neural networks in the present invention provides a means to extend the sequence length, such that even if the neural network used can only output 2 sequences, the output sequence of the system could be increased as a function of the number of levels in the hierarchy. Examples of other neural networks that could be substituted for the ACTION network are Elman and Hopfield networks, which are artificial neural networks, and the biological neural network described in Zipser, "Recurrent Network Model of the Neural Mechanism of Short-Term Active Memory", Neural Computation 3, 179-193, 1991. All of these networks include recurrence, but, unlike the ACTION network, none of these are biological neural networks.

Figure 8:
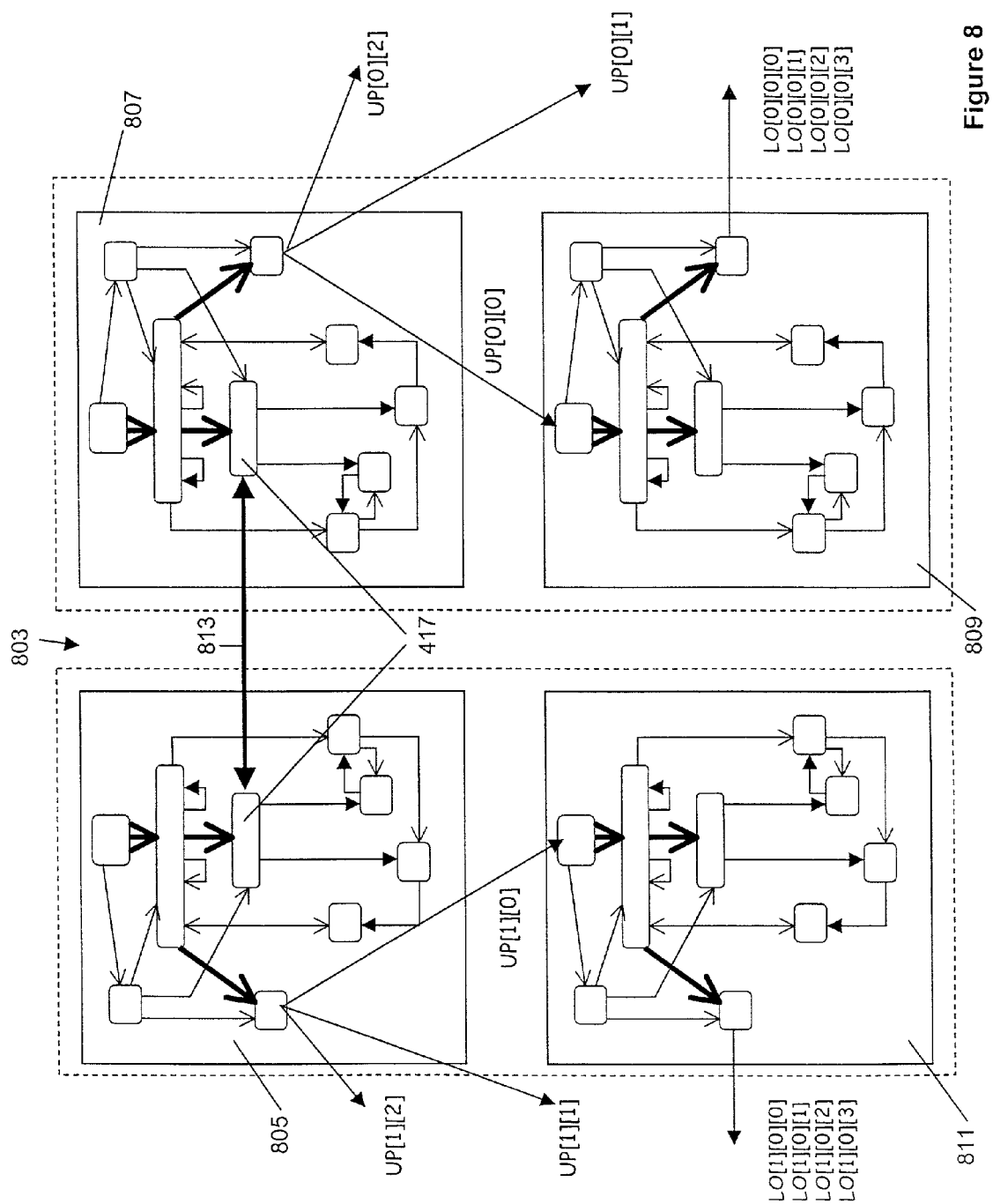
FIG. 8 is a schematic representation of two task units interconnected by a variable weight link according to the present invention.

FIG. 8 shows two task units 801, 803, each having connections from one upper ACTION network 805, 807 to three lower networks, although for both task units only one lower network 809, 811 is shown connected to the upper networks 805, 807 in the Figure for clarity. Between the two task units there is a connection link 813, which is a variable weight connection, is an inhibitory connection (closed arrow heads), and connects the STR layers 417 between associated upper networks 805, 807. This connection could be made at an alternative layer, for example at the GPe 421 layer, as this is also part of the basal ganglia region and has an inhibitory connection to other layers in the ACTION network. When the values held by the upper ACTION networks are tasks, the weight on the link is varied to simulate competition between the respective task units, and thus respective tasks.

As stated above, other neural networks may be substituted for the ACTION network. The Elman neural network, for example, has a hidden layer of nodes between an input and an output layer, and connections may be made between associated hidden layers in a similar manner to that described above for the STR layers in the ACTION network.

Application of Task Units to Learn Sequences of Tasks and Sub-Tasks

The embodiment of the present invention described above can be trained to reproducibly output a series of elements in a known and desired sequence order. When the elements comprise a plurality of tasks and sub-tasks thereof, one way of achieving this, as an embodiment of the present invention, is:

1. Train the apparatus to reproduce the sub-tasks in a known and desired sub-task sequence order; and
2. Train the apparatus to reproduce the tasks in a known and desired task sequence order.

Clearly when there are a plurality of task units as discussed above, training occurs for each individual lower ACTION network of the apparatus before integrating with the upper ACTION networks.

Figure 9:
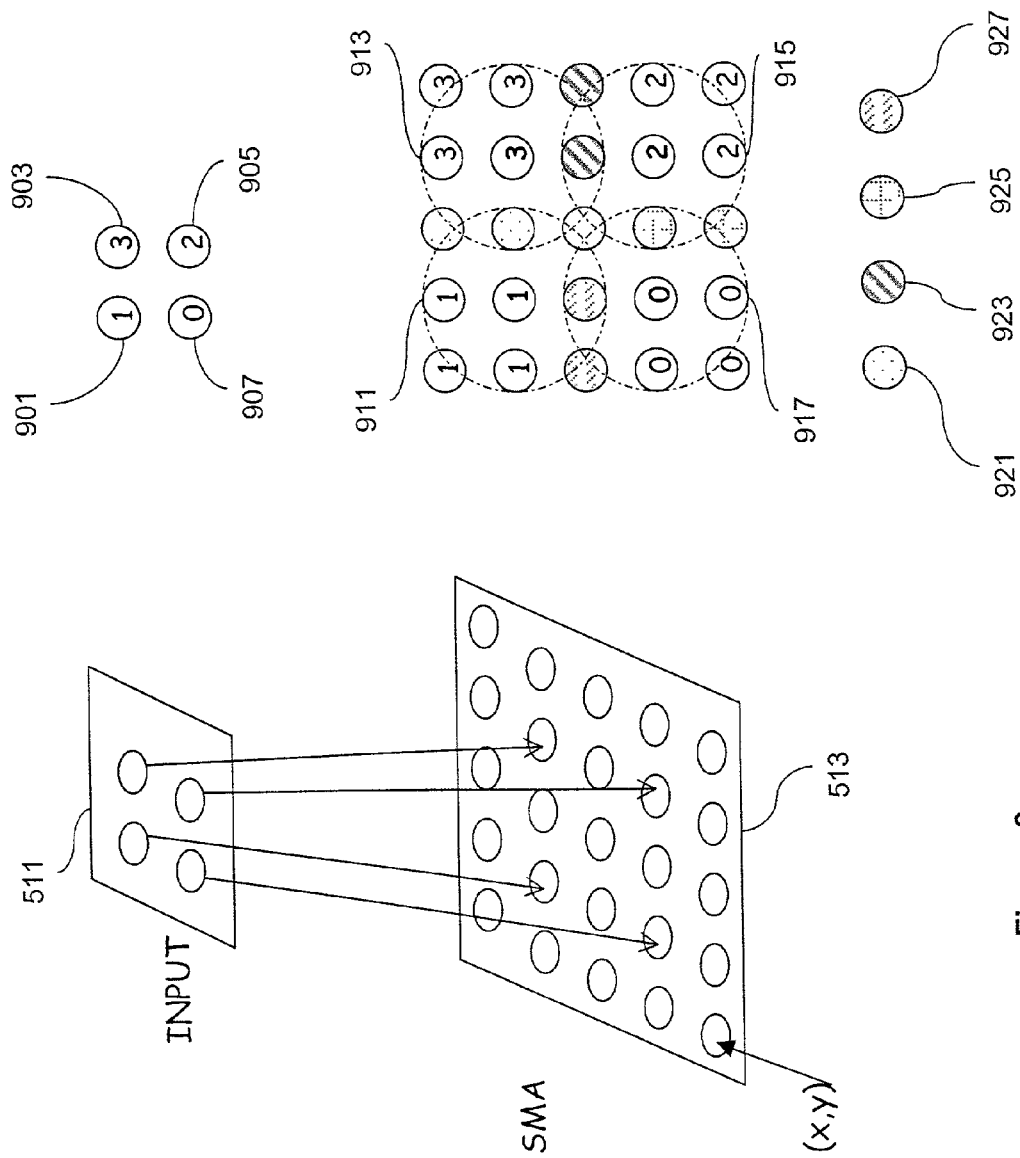
FIG. 9*a* is a perspective schematic representation of INPUT-SMA inter-layer node connections of FIG. 4 having square node patterns.
FIG. 9*b* is a two-dimensional representation of inter-layer weight initialisation of the layers shown in FIG. 9*a*.
Figure 10:
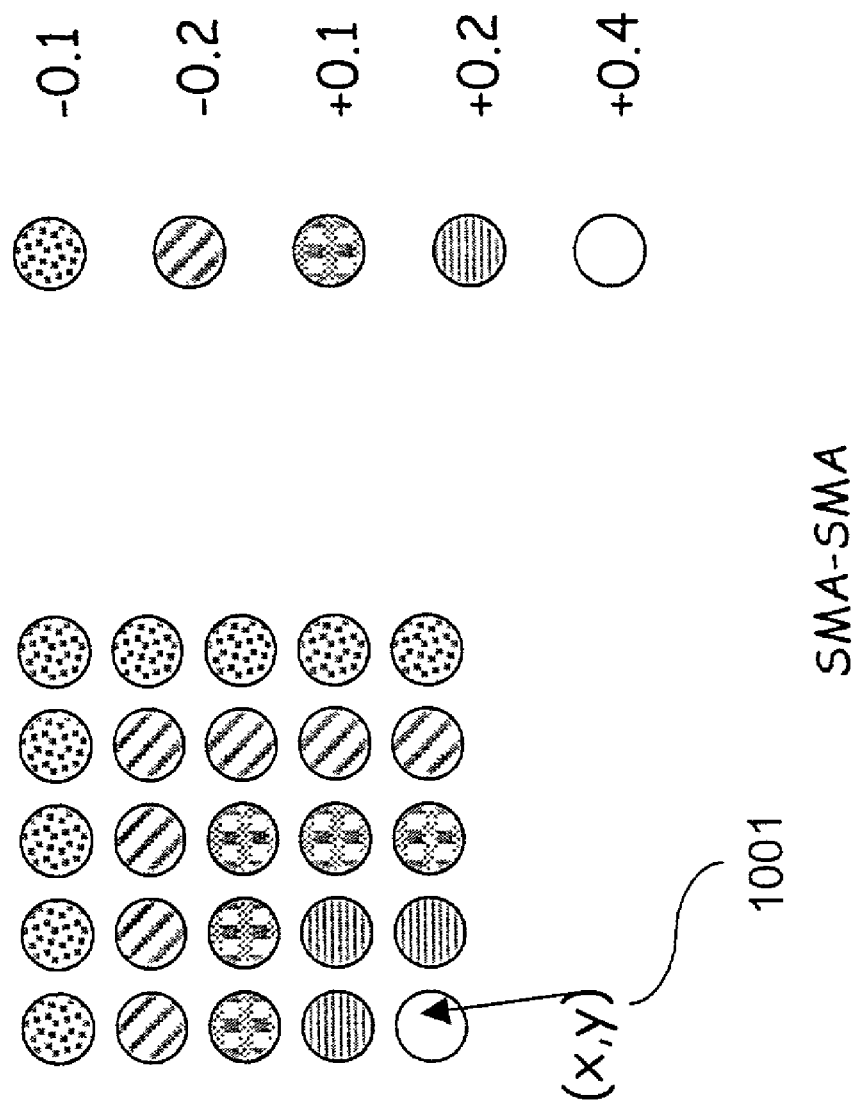
FIG. 10 is a two-dimensional representation of intra-layer weight initialisation for the SMA layer.
Figure 11:
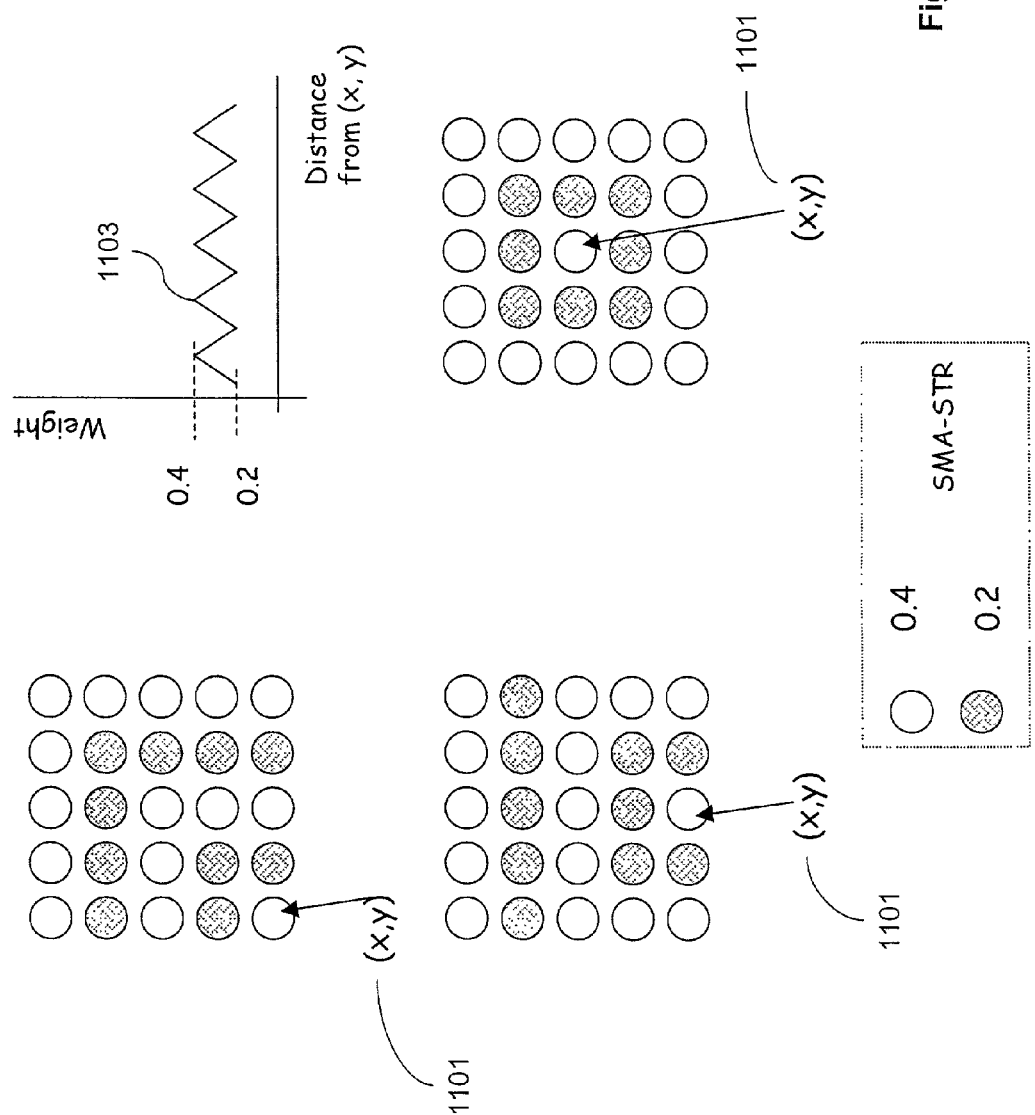
FIG. 11 is a two-dimensional representation of inter-layer weight initialisation for the SMA-STR layers, showing an identical 'saw tooth' weight distribution from three different node positions.

Returning to FIG. 4, and representing each sub-task by a specific number, a plurality of numbers are input to the ACTION network 403. As an alternative configuration to the node arrangement shown in FIG. 5, the IN 511, PMC 515 and OUT 527 may each comprise 4 nodes in 2×2 arrangement, as shown in FIG. 9a. All of the other layers may similarly have a square intra-layer node pattern, but of 5×5, 8×8 nodes or any other size matrix, and FIGS. 10 and 11 show grids of 5×5 nodes for the SMA 513 and STR 517 layers. FIG. 9a shows the links between INPUT 511 and SMA 513 layers, and FIG. 9b shows a two-dimensional representation of the initial weight settings on the links between INPUT 511 and SMA 513. The connectivity between these layers is Gaussian, as can be seen from the distribution on the SMA nodes, where each of the nodes 901, 903, 905, 907 on the INPUT layer links to nine nodes 911, 913, 915, 917 on the SMA layer. A number of SMA nodes 921, 923, 925, 927 receive inputs from two nodes on the INPUT layer, and the central node 931 receives inputs from each node of the INPUT layer.

FIG. 10 shows the lateral connection (intra-layer) weights on the SMA 513 layer (intra-layer connection is indicated on FIG. 4). The lateral connections are made from the bottom left node 1001 outwards, and the intra-layer weight distribution function is Mexican hat and is inhibitive.

With square node arrangements, it is possible to have symmetrical weight initialisations, such that each input pattern of each sequence has the same initial effect on other pattern representations. In other words, the distribution of weights is independent of node position in the grid. Thus, with reference to FIG. 11, which shows the connection weights between the SMA 513 and the STR 517 layer, the distribution of weights creates an identical "saw tooth" pattern 1103, irrespective of the position of the node in question 1101. The "saw tooth" profile 1103 may oscillate between weight values of 0.2 and 0.4, as a function of distance away from the node in question, as shown in FIG. 11, creating rings around the node.

As discussed above, the links between the INPUT 511 to SMA 513, and SMA 513 to STR 517 are of variable weight, such that the weight required to provide a desired output is learnt (discussed below). In a preferred embodiment, and as shown by the arrow-head 407, these weights must be excitatory as well as variable. All of the other weights are fixed. The values shown in FIGS. 9b, 10 and 11 provide a working set for the preferred embodiment, and the invention is not limited to use with these values only; it is understood that alternative and equivalent arrangements may equally be used.

Once the weights have been initialised, and the type of spread of weights (i.e. Gaussian, Mexican Hat) and connectivity between nodes (Gaussian, All-to-All, One-to-One) have been defined, these parameters are combined with the equations governing inter-layer interactions as follows (IN- PUT, PMC, SMA and STR (see Taylor, 1998, "Modelling Temporal Sequence Learning", University of London, PhD) shown only):

1. INPUT:

$$I_i(t)=1 \text{ if node "ON"}; \quad (1)$$

$$I_i(t)=0 \text{ if node "OFF"}$$

2. PMC:

$$P_i(t)=\lambda P_i(t-1)+\Sigma w^1_{ji} f(I_j(t-1)) \quad (2)$$

where $w^1$ are the weights from INPUT to PMC, and the output function $f$ is defined as $$f(x)=\tan h(x) \text{ if } x>0$$

$$f(x)=0 \text{ otherwise}$$

3. SMA:

$$S_i(t)=\lambda S_i(t-1)+\Sigma[w^2_{ji} f(I_j(t-1))+w^3_{ji} f(P_j(t-1))+w^4_{ji} fg(S_j(t-1))]+h(T_i(t-1)) \quad (3)$$

where $w^2$, $w^3$, $w^4$ are the weights from IN to SMA, PMC to SMA and lateral SMA weights respectively, and the output functions are defined as:

$$g(x)=\tan h(x) \text{ if } x>0$$

$g(x)=0$ otherwise, and the threshold learnt for each SMA node, h(x) is:

$$h(x)=\tan h(x+0.4)$$

4. STR:

$$R_i(t)=\lambda R_i(t-1)+\Sigma[w^5_{ji} f(S_j(t-1))+w^6_{ji} f(R_j(t-1))+w^7_{ji} f(P_j(t-1))-c_{ji} f(R_k(t-1))] \quad (4)$$

where $w^5$, $w^6$ $w^7$ care the weights from SMA to STR, lateral STR, PMC to STR and inter-task unit STR weights respectively (see later). Note that the latter term (accounting for inter-task unit STR) is subtracted from all of the other terms.

Assuming a single input, this input is presented for ten time-steps, and the weight update during the first nine time-steps is Hebbian:

$$w_{ij}(t)=w_{ij}(t-1)+af(act_i)f(act_j) \quad (5)$$

if $f(act_i)>0$ and $f(act_j)>0$ where $f(act_i)=\tan h(act_i)$ otherwise $$w_{ij}(t)=w_{ij}(t-1) \quad (6)$$

where $w_{ij}$ connects node i to node j, $act_i$ is the potential of node i and $act_j$ is the potential of node j, and a is a learning rate. Suitable learning rates for the present embodiment may include 0.001, 0.01 or 0.1.

At the tenth timestep, the system is rewarded if the output is correct, or penalised if the output is wrong:

$$w_{ij}(t)=w_{ij}(t-1)+a.\text{reward}.f(act_i)f(act_j) \quad (7)$$

where $f(act_i)=\tan h(act_i)$, and reward may be 1 if output correct and −2 if output incorrect.

The reward and learning values above provide a working set for the present embodiment and the invention is not limited to these values.

The equations for the SMA, PMC and STR are simple leaky integrator equations that include history effects from previously activated nodes. In other words, and referring to FIG. 5, although the activity on the PMC changes from 503*a*-503*b*-503*c*-503*d*, all previously activated nodes include residual activity, and this activity decays slowly over time rather than switching on and off sharply. As the history effects diminish, the activation on the nodes is refreshed (as the cycle of 503*a*-503*b*-503*c*-503*d* is repeated), and this maintains a continuous source of activity on the nodes. By contrast, the INPUT equation (equation 1) is a step function and independent of history effects. Thus, with reference to FIG. 9*a*, the inputs from the INPUT to the SMA switch on and off as the INPUT layer moves through its sequence. In order to generate the saw tooth profile 1103 on the STR (FIG. 11), the SMA needs to retain activity on previously activated nodes, and since the INPUT only switches between nodes this retained activity is provided by the PMC input.

Figure 12:
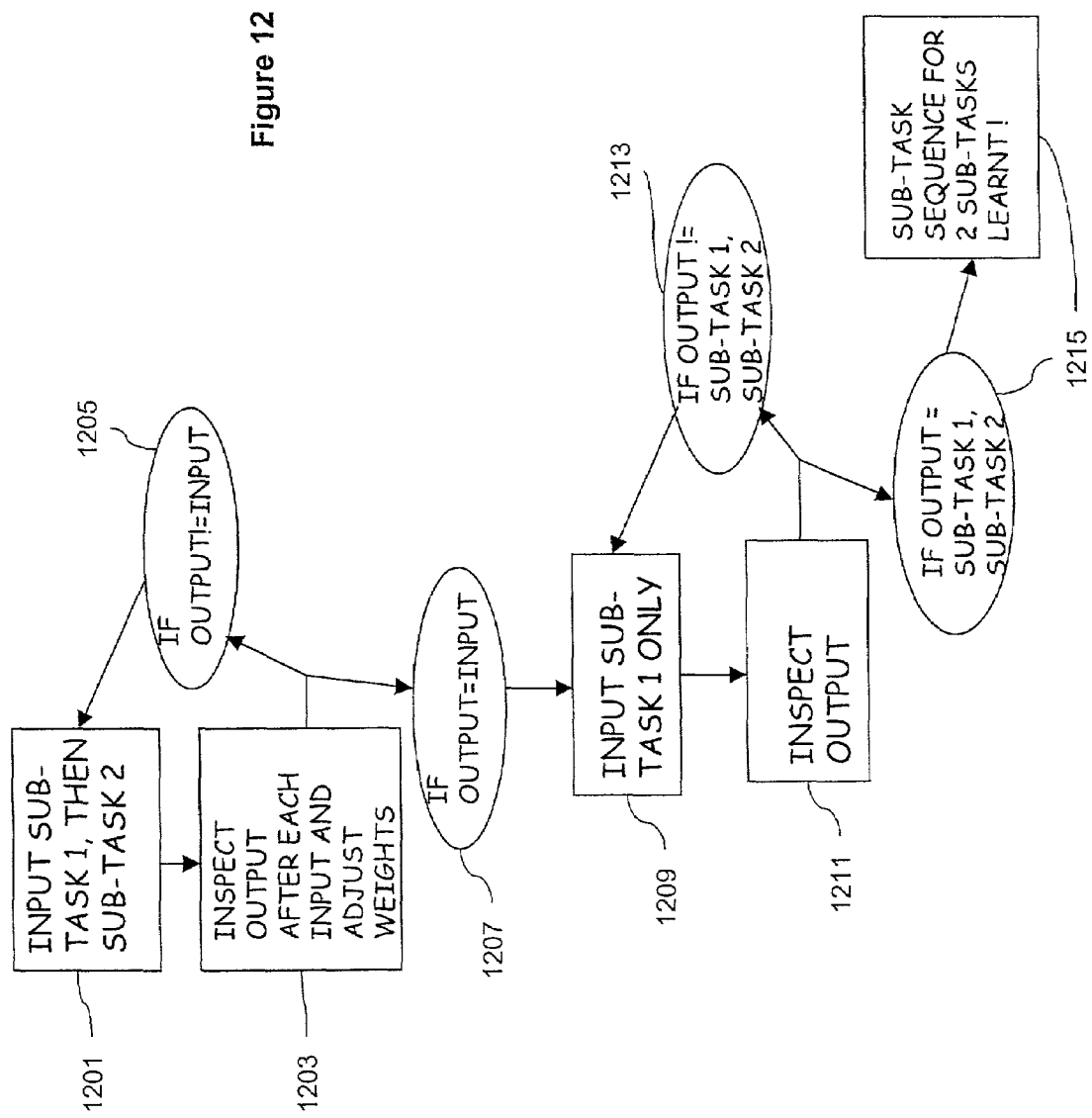
FIG. 12 is a block diagram representation of the process of training the apparatus of the present invention to reproduce a sequence of two inputs from a single seeding input.
Figure 13:
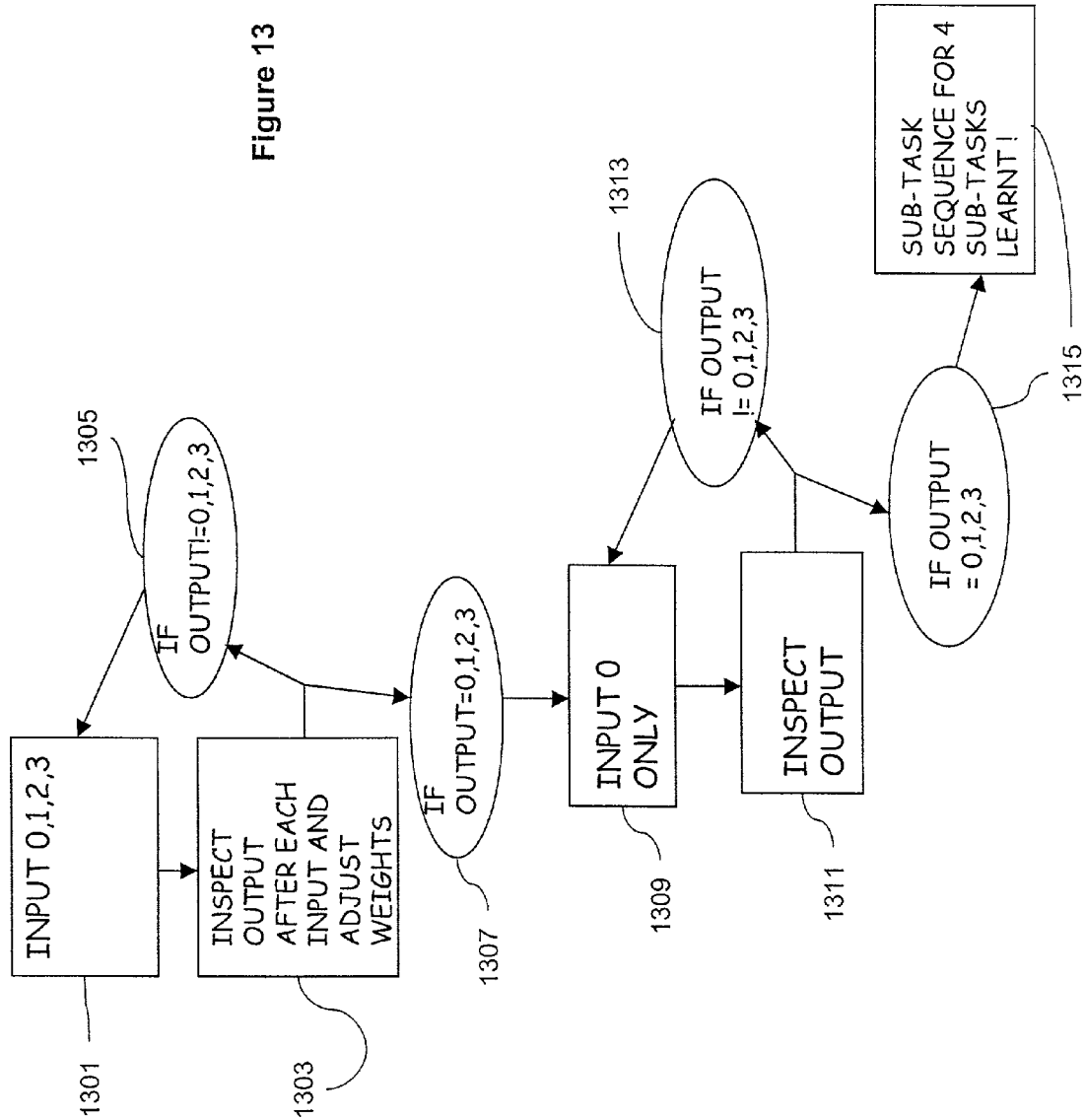
FIG. 13 is a block diagram representation of the process of training the apparatus of the present invention to reproduce a sequence of four inputs from a single seeding input.

Referring to FIG. 12, training begins with the presentation of the first two inputs of the sequence 1201, for which the output must correctly reproduce the inputs in response (when the above equation set is run for 10 timesteps per input to the ACTION network, which for this example, of two inputs, is 20) 1203. At the tenth timestep per input, if the output array is not in the order of the two inputs 1205, the weights are made more negative by a value equal to the reward of Equation 7 so that the order will have changed at the end of the next run. This process is repeated (run system-inspect output-apply reward) until the output array correctly reproduces the sequence of the two inputs. Once this has been performed correctly 1207, the ACTION network is presented with the first of the two inputs only 1209, in response to which it is required to produce the first output followed by the second output 1211 (the first and second outputs being generated internally by the network). Hence the first input is used to initiate the sequence regeneration and is known as the 'seeding' input. If the output fails to correctly reproduce the series of two inputs, the system has to re-learn this single seeding stage 1213 by repeating the whole of step 1209. When the two-length sequence is successfully reproduced at the output 1215, the first three inputs are presented to the ACTION network, and the output must correctly reproduce the inputs in the correct order. The net is seeded again with the first input only, and the network must produce a three-length sequence output in the correct order. In the present embodiment, this is repeated for a maximum of four inputs, as shown in FIG. 13.

Figure 14:
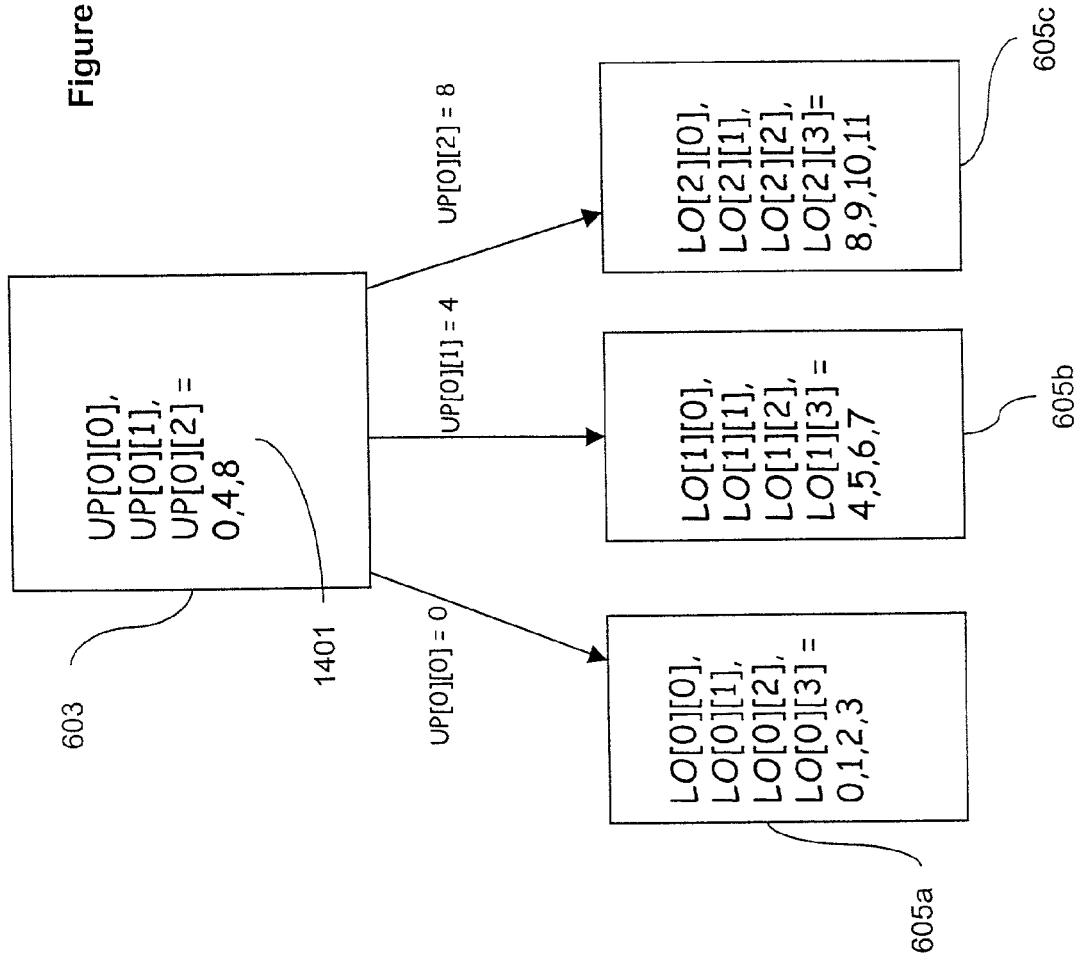
FIG. 14 is a schematic representation of the three task units of FIG. 7; showing the upper and lower ACTION network output arrays after training.

In order to produce sequences of length greater than four, one ACTION network may be combined with a number of other ACTION networks in a hierarchical relationship to form a task unit, described earlier and shown in FIG. 6. In its simplest form, two ACTION networks can be coupled together via a third ACTION network—for example referring to FIG. 7—upper ACTION network 603 forms the third ACTION network and connects to two lower ACTION networks 605*a* and 605*c*. Thus the output from the upper ACTION network 603 acts as a seeding pattern to the lower ACTION networks 605*a*, 605*c*. Hence whilst the lower ACTION networks 605*a*, 605*c* are trained on a consecutive sequence of sub-tasks of up to length four, the upper ACTION network 603 is trained (in an identical manner as described above) to generate the first, then every fourth subsequent input in response to seeding with its first input 411*a* (FIG. 6). In this way, the upper ACTION network 603 will initiate the series of sub-tasks in the order specified in its output array 1401, in FIG. 14 (as can also be seen in FIGS. 7 and 8). The whole sequence will be generated in the correct order from a single seed into the upper ACTION network, while the outputs therefrom are hidden and the sub-task sequence is controlled by the lower ACTION networks 605a, 605b, 605c. FIG. 14 also shows that the inputs to and outputs from the ACTION networks are numbers, which may be hard-wired or software switched, depending on the system design, to effect tasks or sub-tasks.

Figure 15:
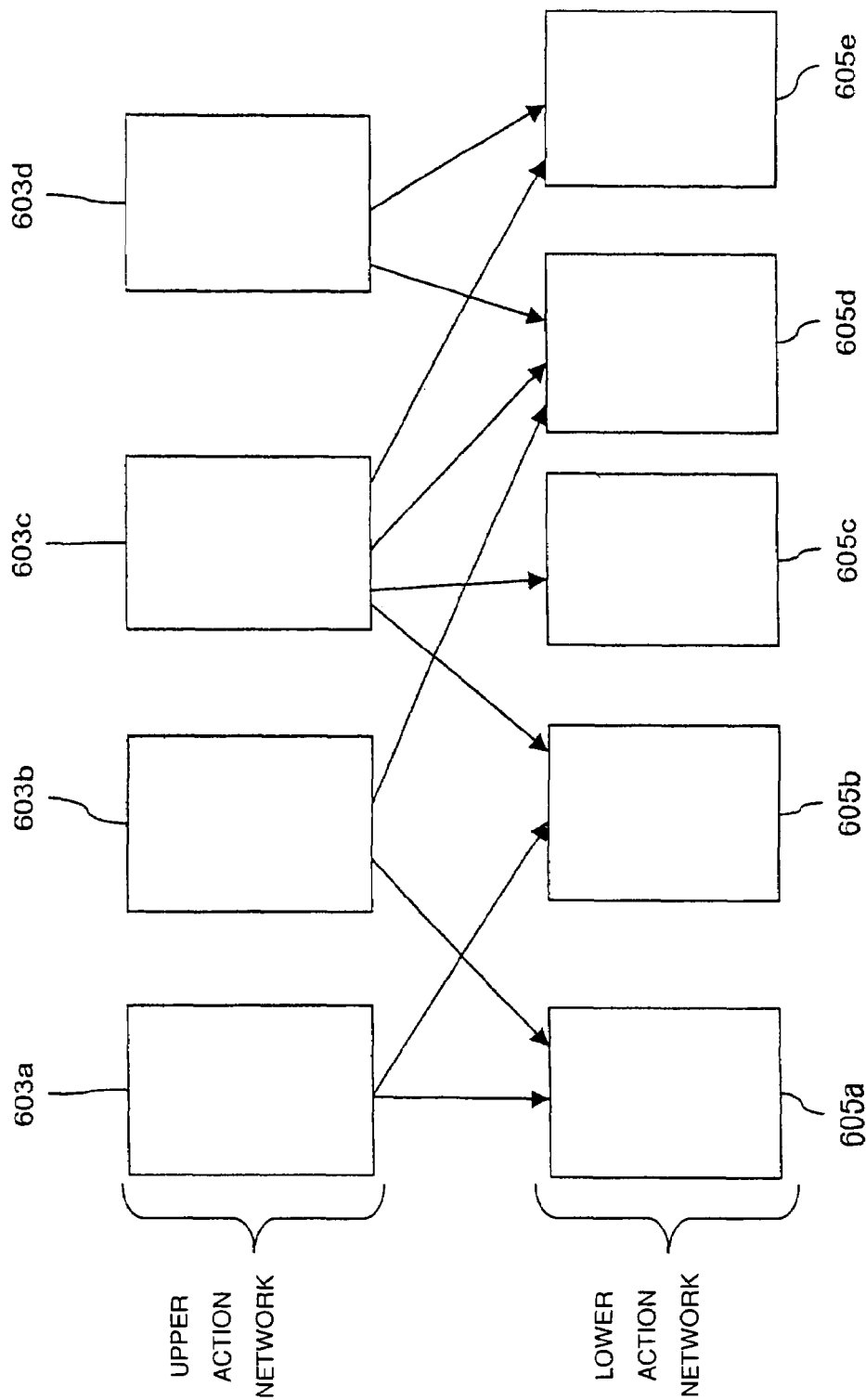
FIG. 15 is a schematic representation of a plurality of task units formed from multiple connections with each lower ACTION network.

One benefit of this hierarchical structure of a task unit is the re-usability of lower ACTION networks by many upper ACTION networks, as can be seen from FIG. 15. A sequence of four sub-tasks will only be learnt once, and can be integrated with any number of upper ACTION networks to form many permutations thereof.

A further benefit is the ability to increase the number of output sequences (by indefinitely coupling together ACTION networks as described earlier) at minimal computational cost. This can be compared with alternative systems designed to achieve longer sequences where, for example, the layers contain three-dimensional arrangements of nodes. In this case, the number of nodes (and hence computational cost) increases exponentially with the number of output sequences. In the present invention; the computational cost scales linearly with the number of output sequences.

The process described above provides a means for generating sequences of tasks and sub-tasks contained within a single task unit, but does not address the issue of controlling the order in which task units operate when the apparatus comprises a number of task units, such as is shown in FIG. 15. This has a particular application in ordering a series of tasks, or a pool of tasks, for an entity such as a user or a software agent (once the apparatus has access to the entity's preferred order of task operation). As discussed earlier, and as shown in FIG. 8, a variable weight connection between task units, specifically between the STR 417 of the upper ACTION networks, provides a means for varying the relative strength between task units. When the system is run, the presence of the variable weight connection will result in one dominant task unit, and thus one dominant task among the said task units. For the purposes of ordering a number of tasks each task unit may only output a single task, such that, if one upper neural network is connected to a series of lower neural networks, as shown in FIG. 7, each of the outputs of the lower neural networks must be sub-tasks of a single task. In this case, the single task may be provided by the first output of the upper neural network. If there is more than a single task provided by a task unit, the order in which it occurs will be directly controlled by the first task, which first task competes with tasks from other task units in the manner described above, and is not accessible in the competing process. The learning process in this case involves inputting all tasks in the pool to the system, and adjusting the inter-task unit weights 813 until the dominant task is the user's preferred first task. The inter-task weights 813 are updated according to a modified reinforcement training law:

$$c_{i*j} = c_{i*j} + 0.5 \cdot \text{reward} \cdot \text{act}_j \text{act}_{i*} \quad (8)$$

and $$c_{ji*} = c_{ji*} - 0.5 \cdot \text{reward} \cdot \text{act}_j \text{act}_{i*} \quad (9)$$

where reward=1 if dominant task matches user's preferred first task and

=−1 if dominant task does not match user's preferred first task.

$i*$ represents the dominant task unit, and $\text{act}_k$ is the average output of a STR node during the competing process from task unit k. The reward values provide a working set for the present embodiment and the invention is not limited to these values.

Equation 8 therefore has the effect of changing the weights to whichever task unit is dominant after running the system, and these become less negative if the dominant task unit matches the user's preferred first task (is 'correct') by reducing combined inhibitory action (recall that these connections 813 are inhibitory). If the dominant task unit does not match the user's preferred first task (is 'incorrect'), the weights are made more negative such that it will not be dominant after the next run. Recalling Equation 7, it can be seen that the term coupled with these weights is subtracted from all of the other terms controlling the potential of nodes on the STR layer. Thus although the inter-task weights 813 are made more negative if the apparatus outputs an incorrect first task, the weights cannot become equal to or less than zero. Equation 8 controls the weights from the dominant task unit to all other task units that were excited. If the dominant task unit is correct, the inhibitory weights are strengthened to all other active task units; if incorrect, the weights are weakened. Equations 8 and 9 only act on active task units, such that any task units in the apparatus that do not form part of the current task sequences are unaffected by this process.

Once the competitive weights 813 have been learnt and the dominant task unit is correct, that task is removed from the pool of tasks and training continues using the same method with the remaining tasks. For example, given a pool of tasks $\{T_1, T_2, T_3, T_4, T_5, T_6\}$ (these tasks may be: e-mail housekeeping, write report 1, meeting 1, meeting 2, read report 2, surf the www; typical sub-tasks, which have been learnt before according to equations 1-4 as described above, for e-mail may include open e-mail, reply, archive, close), with a preferred user order of $T_2, T_6, T_1, T_5, T_3, T_4$, training commences with inputs to all active task units, and equations 8 and 9 are adjusted so that the task unit corresponding to task $T_2$ is dominant. $T_2$ is then removed from the pool, and the weights modified by equations 5 and 6 until the task unit corresponding to task $T_6$ is dominant. This process is repeated until there are no tasks left to order, and the time taken to converge to the desired task reduces considerably as the number of tasks in the pool is reduced.

The final process to be performed by the apparatus is to produce a plan from a pool of tasks, such as the six described above. The apparatus has learnt a number of sequences, which may represent a user's preferred work pattern as defined in the user profile 203, and the goal of the apparatus is to re-produce this pattern when all of the tasks are input thereto. All of the task units comprising the (trained) apparatus will become active, and the system is then run using the weights learnt from the learning period. This allows each task unit to compete with one another such that at the end of the run, one task unit will be dominant. The output from the upper ACTION network forming part of the dominant task unit is taken to be the user's first preferred task (entered into a work-plan for the user), and this task is removed from the pool of tasks. The reduced pool is re-input to all of the task units and the process repeated. A new dominant task unit will emerge at the end of the run, and the corresponding task is removed from the pool whilst being entered second on the user's work-plan. This method of competition and dominant task removal continues until only one task is remaining in the pool, at which point it is placed last in the user's work-plan.

The resource provided by the apparatus 201, which can generally be described as generating a plan for a pool of tasks as described above, has many wide ranging applications. When the apparatus 201 is integrated into the intelligent assistant system 219, it can be used to organise tasks received by the diary assistant 205, and to organise system tasks scheduled by the coordinating assistant 217. The following scenarios illustrate typical interactions:

The diary assistant 205 may provide a chronological list of tasks completed during the day to the user profile 203, which is assumed to be the user's preferred order and is used as training data by the apparatus 201. The diary assistant 205 may also send a 'TO-DO' list to the apparatus 201 at the end of a day and at the beginning of a day (to capture the most up-to-date list of tasks), which forms the pool of tasks to be ordered by the apparatus 201. The apparatus 201 generates a sequence for these tasks as described above, and the sequence is sent as a suggested sequence to the diary assistant 205 to be incorporated in the diary assistant's scheduling procedure. The sequence of tasks generated by the apparatus 201 is categorised as a suggested sequence because the diary assistant may have certain tasks which cannot be moved—for example scheduled meetings etc.

The co-ordinating assistant 217 schedules tasks that are internal to the intelligent assistant system 219, and thus are not handled by the diary assistant 205. These may include email maintenance, which includes reading backlogs of emails in the inbox, reading web and yellow pages assistants search results, and reviewing lists of blocked calls. The coordinating assistant 217 may communicate with the user profile 203 to relate the order in which such tasks were completed during the day, and may send a system 'TO-DO' list to the apparatus 201 for the following day. When the apparatus 201 receives the 'TO-DO' list, it 201 may consult the user profile 203, learn according to the sequence stored therein, and organise a suggested sequence for outstanding system tasks, which is sent to the co-ordinating assistant 217.

Clearly in both of these cases the chronological list of tasks completed during a day could be passed to the apparatus 201 directly from both the diary and coordinating assistants 205, 217.

What is claimed is:

1. A neural network apparatus comprising:
a task unit having an upper and a lower neural network connected in a hierarchical relationship, wherein the upper neural network and the lower neural network each comprise at least a first layer and a second layer, the second layer having feedback to the first layer via a further layer, and
at least one other task unit so that the neural network apparatus includes a plurality of task units,
wherein one upper neural network is common to at least two of the plurality of task units, the upper neural network is operable to output a sequence of elements, and the order in which elements occur in the sequence determines the order in which the task units are activated;
the apparatus comprises at least two upper neural networks;
each task unit is interconnected with at least one other task unit of the plurality by a weighted connection; and
the weighted connection between said plurality of task units is between the second layers of the upper neural networks of each respective task unit.

2. The apparatus as in claim 1, including means for varying the weight on a weighted connection, for use in changing a preference for activating one task unit with respect to other task units.

3. The apparatus as in claim 1, wherein each of the lower neural networks is operable to output a sequence of elements, so that, when a task unit has been activated, the lower neural networks output a sequence of elements.

4. The apparatus as in claim 1, wherein the elements output from at least one of the upper neural networks are representative of a task, and the elements output from the lower neural network are representative of sub-tasks of the task.

5. The apparatus as in claim 1, wherein the sequence output by at least one of the upper neural networks comprises at least four elements.

6. The apparatus as in claim 1, wherein the said first, second and further layers are interconnected by links and at least some of the links are variably weighted, thereby enabling modification of the sequence generated by a task unit.

7. The apparatus as in claim 6, wherein:
(i) each of the layers comprises nodes; and
(ii) the links interconnect the nodes in a layer-to-layer relationship.

8. The apparatus as in claim 7, in which each task unit is operable to symmetrically initialise weights on the links so that the weights are independent of node position.

9. The apparatus as in claim 1, wherein the sequence output by each neural network comprises at least four elements.

10. A neural network apparatus comprising:
a task unit having an upper and a lower neural network connected in a hierarchical relationship, wherein the upper neural network and the lower neural network each comprise at least a first layer and a second layer, the second layer having feedback to the first layer via a further layer, and
at least one other task unit so that the neural network apparatus includes a plurality of task units,
wherein one upper neural network is common to at least two of the plurality of task units by a weight connection between the second layers of the upper neural networks of each respective task unit, the upper neural network is operable to output a sequence of elements, and the order in which elements occur in the sequence determines the order in which the task units are activated.

11. A neural network apparatus comprising:
a task unit having an upper and a lower neural network connected in a hierarchical relationship, wherein the upper neural network and the lower neural network each comprise at least a first layer and a second layer, the second layer having feedback to the first layer via a further layer, and
at least one other task unit so that the neural network apparatus includes a plurality of task units,
wherein each task unit is interconnected to at least one other task unit of the plurality by a weighted connection between the second layers of the upper neural networks of each respective task unit, the weighted connection being for determining a preference for activating one task unit with respect to the other task units of the plurality, and being variable.

* * * * *